(12) United States Patent
Hoffman et al.

(10) Patent No.: US 8,042,831 B2
(45) Date of Patent: Oct. 25, 2011

(54) AIR BAG

(75) Inventors: Sven Hoffman, Dachau (DE); Nico Wallat, Dachau (DE)

(73) Assignee: Autoliv Development AB, Vargarda (SE)

( * ) Notice: Subject to any disclaimer, the term of this patent is extended or adjusted under 35 U.S.C. 154(b) by 51 days.

(21) Appl. No.: 12/524,703

(22) PCT Filed: Jan. 24, 2008

(86) PCT No.: PCT/EP2008/000513
§ 371 (c)(1),
(2), (4) Date: Aug. 13, 2009

(87) PCT Pub. No.: WO2008/092595
PCT Pub. Date: Aug. 7, 2008

(65) Prior Publication Data
US 2010/0117343 A1   May 13, 2010

(30) Foreign Application Priority Data
Feb. 2, 2007   (DE) .......................... 10 2007 005 304

(51) Int. Cl.
*B60R 21/206* (2011.01)
*B60R 21/237* (2006.01)
(52) U.S. Cl. .................. 280/730.1; 280/743.1
(58) Field of Classification Search ............... 280/730.1, 280/743.1
See application file for complete search history.

(56) References Cited

U.S. PATENT DOCUMENTS

| | | | | |
|---|---|---|---|---|
| 4,010,055 A | * | 3/1977 | Oka et al. ................... | 156/226 |
| 4,944,529 A | * | 7/1990 | Backhaus .................. | 280/743.1 |
| 5,048,863 A | * | 9/1991 | Henseler et al. ........... | 280/743.1 |
| 5,316,337 A | * | 5/1994 | Yamaji et al. .............. | 280/743.1 |
| 5,333,903 A | * | 8/1994 | Eyrainer et al. ............ | 280/743.1 |
| 5,482,318 A | * | 1/1996 | Sollars, Jr. ................. | 280/743.1 |
| 6,155,595 A | | 12/2000 | Schultz | |
| 6,168,203 B1 | * | 1/2001 | Amamori .................... | 280/743.1 |
| 6,224,100 B1 | * | 5/2001 | Kamano et al. ............ | 280/743.1 |
| 6,685,791 B1 | * | 2/2004 | Frei ............................ | 156/250 |
| 6,942,245 B2 | | 9/2005 | Takimoto et al. | |
| 7,207,594 B2 | | 4/2007 | Igawa et al. | |

(Continued)

FOREIGN PATENT DOCUMENTS
DE          4226954 A1   *   2/1994
(Continued)

OTHER PUBLICATIONS

Amano et al., Bag Body for Air Bag Device and Manufacture of Bag Body, Nov. 10, 1998, JPO, JP 10-297402 A, English Abstract.*

(Continued)

*Primary Examiner* — Paul N Dickson
*Assistant Examiner* — James English
(74) *Attorney, Agent, or Firm* — Harness, Dickey & Pierce, P.L.C.

(57) ABSTRACT

Described is a gas bag for a motor vehicle with a gas bag envelope surrounding a gas space, wherein the gas bag envelope comprises a front section (12) having an impact area (12a) and a rear section (14) directly connected with the front section (12) via a circumferential edge (11) having a support area (14a). Here, the rear section (14) has a folding for the contouring of the gas bag. In order to achieve that the gas bag adapts to a convexly bent surface shape of a part of the vehicle interior structure against which it rests without external catching bands or the like the folding consists of at least one first fold (18) extending parallel to the rear section and at least a second fold (20), wherein the second fold (20) is arranged in the first fold (18) and substantially stands perpendicularly to the rear section (14).

9 Claims, 3 Drawing Sheets

U.S. PATENT DOCUMENTS

| | | | |
|---|---|---|---|
| 7,396,042 B2 * | 7/2008 | Mabuchi et al. | 280/730.2 |
| 2002/0171232 A1 | 11/2002 | Abe | |
| 2003/0030255 A1 * | 2/2003 | Igawa et al. | 280/730.1 |
| 2003/0132617 A1 | 7/2003 | Takimoto et al. | |
| 2003/0184069 A1 * | 10/2003 | Takimoto et al. | 280/743.1 |
| 2005/0151351 A1 * | 7/2005 | Enders et al. | 280/730.1 |
| 2005/0173899 A1 * | 8/2005 | Korechika | 280/730.1 |
| 2009/0152847 A1 * | 6/2009 | Hong et al. | 280/730.1 |
| 2010/0253055 A1 * | 10/2010 | Schneider et al. | 280/742 |
| 2010/0270779 A1 * | 10/2010 | Enders et al. | 280/730.1 |

FOREIGN PATENT DOCUMENTS

| | | | |
|---|---|---|---|
| DE | 4443949 C1 * | 2/1996 | |
| DE | 29807424 U1 | 8/1998 | |
| EP | 0 495 409 A1 | 7/1992 | |
| EP | 787673 A1 * | 8/1997 | |
| EP | 1 283 136 A2 | 2/2003 | |
| EP | 1 300 299 A1 | 4/2003 | |
| JP | 10297402 A * | 11/1998 | |
| JP | 11020586 A * | 1/1999 | |
| JP | 2001163145 A * | 6/2001 | |
| JP | 2004009992 A * | 1/2004 | |

OTHER PUBLICATIONS

Amano et al., Bag Body for Air Bag Device and Manufacture of Bag Body, Nov. 10, 1998, JPO, JP 10-297402 A, Machine translation of Description.*

* cited by examiner

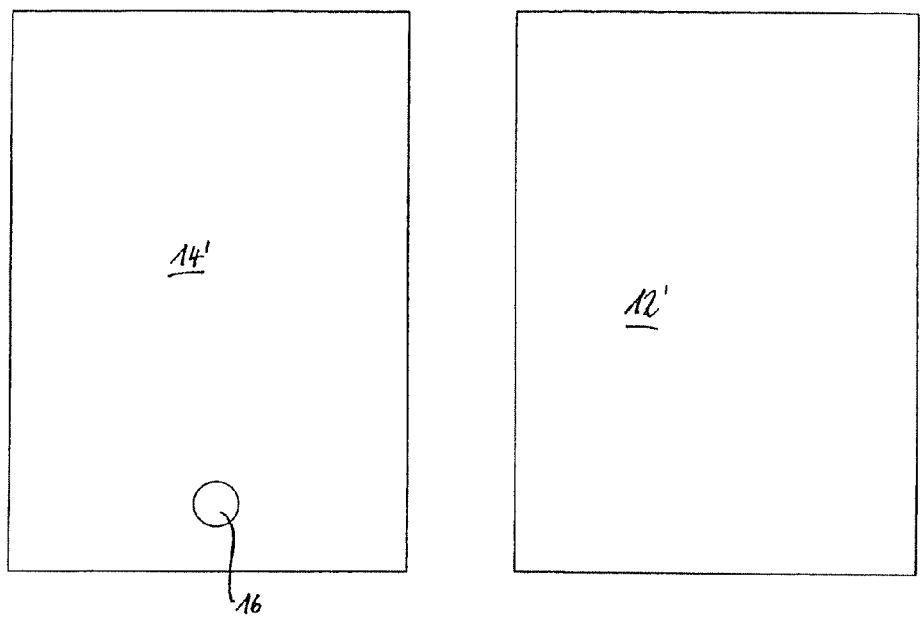
Fig. 2
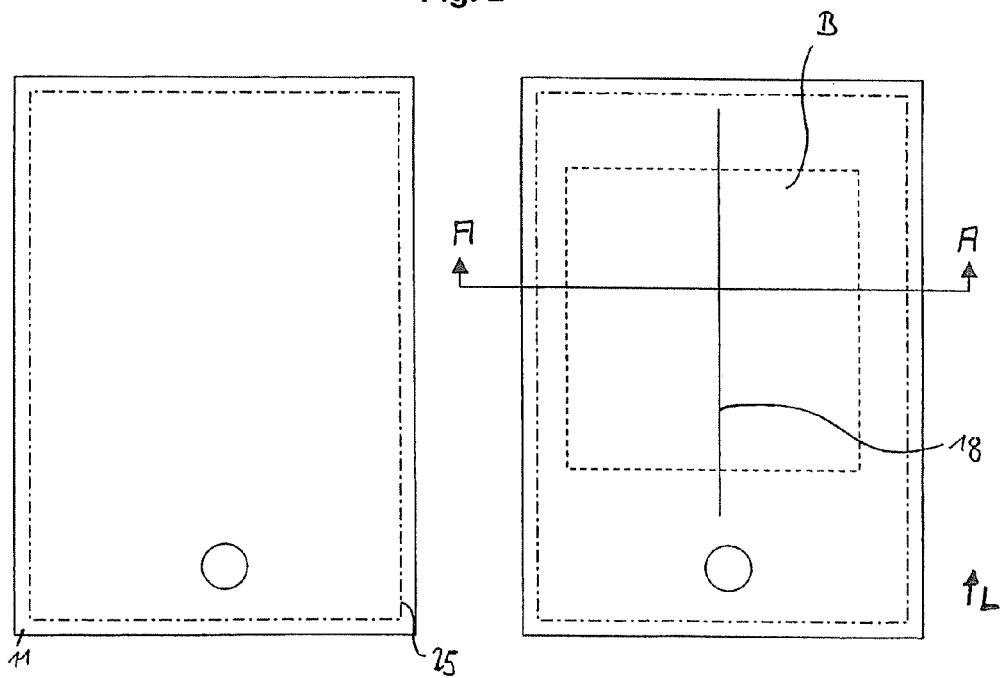
Fig. 3
Fig. 4
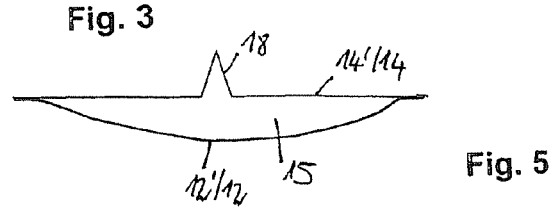
Fig. 5

AIR BAG

CROSS-REFERENCE TO RELATED APPLICATIONS

This application is a 371 U.S. National Stage of International Application No. PCT/EP2008/000513, filed Jan. 24, 2008, which application claims priority to German Patent Application No. DE 10 2007 005 304.7, filed Feb. 2, 2007, the disclosures of which applications are expressly incorporated herein by reference.

TECHNICAL AREA OF THE INVENTION

The invention relates to a gas bag according to the preamble of Claim 1.

PRIOR ART

In the generic EP 1 300 299 A1 a knee gas bag is described whose gas bag envelope comprises a front section forming the impact area and a rear section forming the support area. In this publication it is proposed among other things that the rear section comprises at least one folding in form of a dart such that the rear section adapts itself to the shape of the steering column.

SUBJECT MATTER OF THE INVENTION

Based on this, the present invention sets itself the object of further developing a generic gas bag so that both front section as well as rear section have a bent shape substantially in such a manner that a cross section through the expanded gas bag along a vertically running plane is substantially banana-shaped. Because of this it can be achieved that the gas bag adapts itself to a convexly bent surface shape of a part of the vehicle interior structure against which it rests without external catching bands or the like. Such a gas bag because of this is more preferably suitable for use as knee gas bag since the lower section of an instrument panel frequently has a convex shape. This object is solved through a gas bag with the features of Claim 1.

The rear section of the gas bag according to the invention comprises a first fold extending parallel to this section and at least a second fold, wherein the second fold is arranged in the first fold and substantially stands perpendicularly to the rear section. Here, the first fold preferentially extends over a large part of the length of the rear section and a plurality of second folds are present. These second folds bring about a shortening of the ridge of the first fold. The first fold faces away from the front section of the gas bag, i.e. it is located on the outside of the gas bag. When the rear section is now subjected to pulling stress—which with a fully expanded gas bag is always the case—it assumes a concave shape because of the shortening of the first fold—seen from the outside of the gas bag. The front section of the gas bag is connected with the rear section along a circumferential edge so that it has to substantially follow the shape of the rear section and the desired "banana shape" is formed.

The invention is now explained in more detail by means of an exemplary embodiment making reference to the Figures. Here it shows:

DESCRIPTION OF PREFERRED EMBODIMENTS

Figure 1:
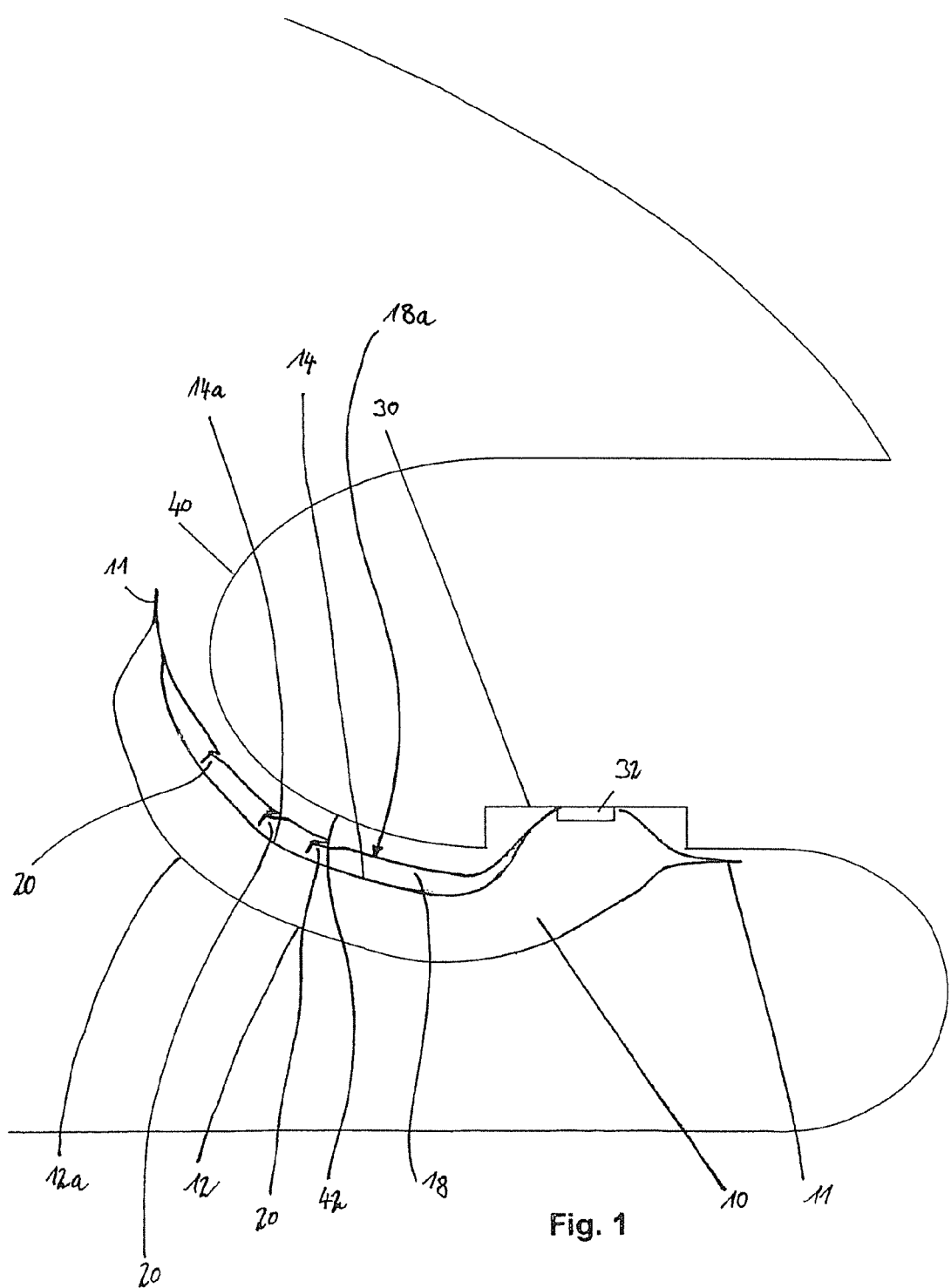
FIG. 1 a schematic view of an instrument panel with an expanded knee gas bag in a sectional view, FIG. 2 two cuts from which a knee gas bag is sewn together, FIG. 3 the two cuts from FIG. 2 after the sewing together, FIG. 4 what was shown in FIG. 3 following the production of the first fold, FIG. 5 a section along the plane A-A from FIG. 4, FIG. 6 the region B from FIG. 3 after the production of second folds in the first fold in a perspective view.

FIG. 1 shows in schematic representation a sectional view of an instrument panel with a completely expanded knee gas bag. The sectional plane here runs vertically and parallel to the vehicle longitudinal direction. In a horizontally running section of the instrument panel 40 located above the foot well a housing 30 is arranged into which in the state of rest a knee gas bag is folded. When required, this knee gas bag 10 is inflated by the gas generator 32 and in the completely expanded state extends as shown in FIG. 1. The envelope of the knee gas bag 10 comprises a front section 12 and a rear section 14 which are connected with each other via an edge region 11. The front section 12 contains the impact area 12a which the knee shinbone region of the associated occupant strikes in the event of an accident. The rear section 14 contains the support area 14a, via which the knee gas bag 10 in the event of being loaded supports itself against the lower section 42 of the instrument panel 40.

As is evident from FIG. 1 the lower section 42 of the instrument panel 40 has a convex shape and the knee gas bag 10 follows this shape so that a cross section shown here is "banana shaped". This means that the surface of the rear section 14 has a convex form. The forming of such a shape with the completely expanded gas bag is achieved by providing special folds in the rear section 14. At least one first fold 18 is present which is located within the sectional plane selected here and extends parallel to the rear section 14. A plurality of first folds 18 which substantially run parallel relative to one another can also be provided. The ridge 18a of this first fold faces to the outside, i.e. in the direction of the instrument panel 40. In this first fold 18 a plurality of second folds 22 are provided which stand substantially perpendicularly to the rear section 14. These second folds 20 are fixed through seams, welding points, gluing points or the like.

The second folds 20, which extend from the ridge 18a of the first fold 18, bring about an effective shortening of the ridge 18a of the first fold 18. Because of this it is brought about that the rear section 14 is only able to assume the bent shape shown when the gas bag is filled with gas. In that front section 12 and rear section 14 are connected with each other via the circumferential edge region 11 the front section 14 also has to assume a suitably bent shape without further measures being necessary on the front section 12. This more preferably also results in that the impact area 12a has the same characteristics as with a conventional knee gas bag.

The generation of the folds 18, 20 is now discussed with reference to the FIGS. 2 to 5, wherein these Figures explain the manufacturing process of such a knee gas bag:

FIG. 2 shows a first cut 12' and a second cut 14'. In the finish sewn-up state the first cut 12' forms the front section 12 and the second cut 14' forms the rear section 14. The two cuts 12', 14' are substantially congruent, wherein however the second cut 14' comprises an inlet opening 16 for the gas generator 32. In a first operation the two cuts are connected with each other in an edge region 11 by means of a circumferential seam 25 so that what is shown in FIG. 3 is created. It is however also possible to produce such a knee gas bag 10 from a one-piece cut, wherein then the front section 12 is folded onto the rear section and sewn together with a U-shaped seam. Furthermore the gas bag can also be woven in one piece.

FIG. 4 shows what is shown in FIG. 3 after the arrangement of a first fold 18. This fold extends in longitudinal direction L of the second cut 14', wherein it preferentially does not extend as far as to the edge. As already mentioned, a plurality of first folds 18 which substantially run parallel to each other can also be provided in this manner.

FIG. 5 shows a section along the plane A-A from FIG. 4. It is evident that the ridge of the first fold faces to the outside, i.e. away from the gas space.

Figure 6:
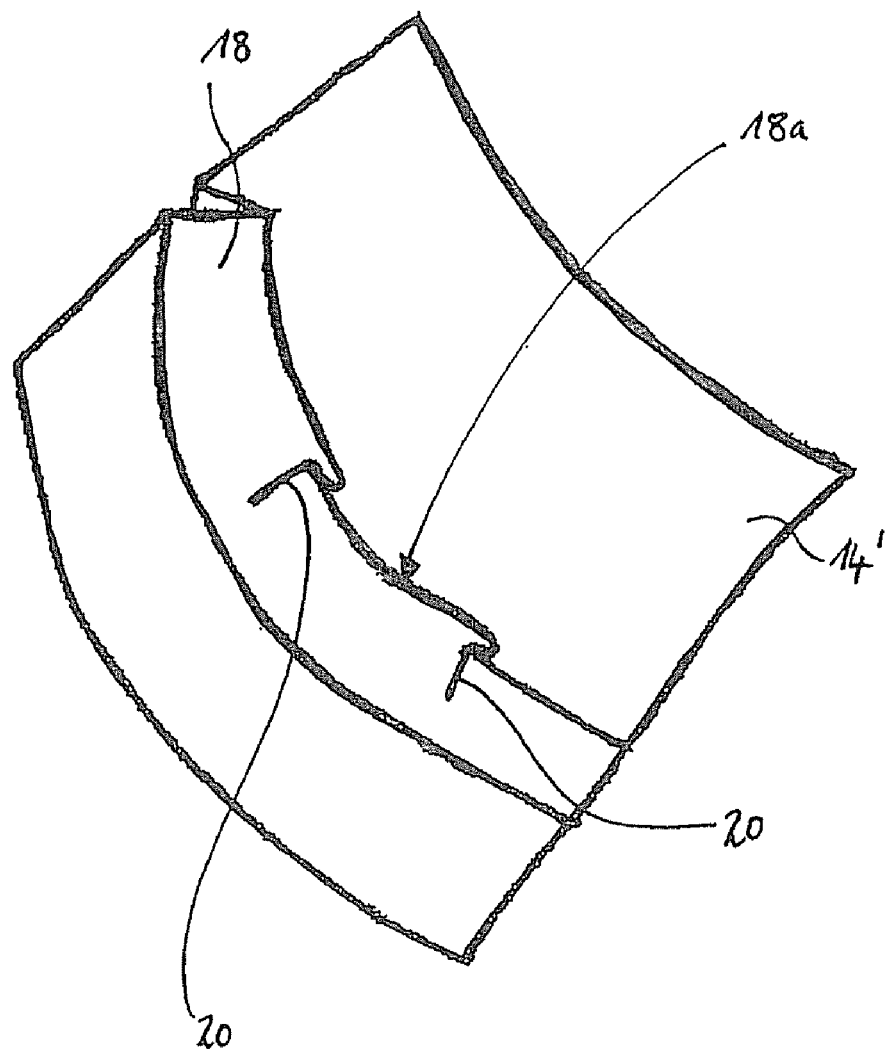

As is more preferably evident from FIG. 6, second folds 20 are now folded into this first fold 18 and fixed. Fixing can be effected through sewing, welding, gluing or the like. These second folds 20 substantially extend perpendicularly from the ridge 18a of the first fold 18 and to the surface of the second cut 14'. Perpendicularly in this context does not mean that an angle of exactly 90° is reached but merely that the second folds 20 run in transverse direction to the first fold 18. This arrangement of the folds 18, 20 produces a curvature of the second cut 14' provided it is subjected to tensile stress. This type of curvature is also hinted in FIG. 6. Upon complete charging of a gas bag the gas bag fabric is always subjected to tensile stress so that the desired shape is then formed.

The invention shown here is more preferably suitable for knee gas bags, but other applications are also conceivable where the foldings described here are provided on other gas bags.

LIST OF REFERENCE SYMBOLS

10 Knee gas bag
11 Edge region
12 Front section
12' First cut
12a Impact area
14 Rear section
14' Second cut
14a Support area
15 Gas space
16 Inlet opening
18 First fold
18a Ridge
20 Second Fold
25 Circumferential seam
30 Housing
32 Gas generator
40 Instrument panel
42 Lower section
44 Windscreen

The invention claimed is:

1. An inflatable restraint for a motor vehicle comprising:
an air bag defining a chamber, the air bag including a front section having an impact area and a rear section connected with the front section, the rear section including a folding for contouring of the air bag, the folding including at least a first fold and at least a second fold, the first fold extending in a first direction at least substantially along a length of the rear section, the first fold being folded to define the second fold such that a ridge of the first fold is shortened in length relative to a base of the first fold;
wherein the first fold is perpendicular to the second fold.

2. The inflatable restraint according to claim 1, wherein the air bag includes two cuts.

3. The inflatable restraint according to claim 1, wherein the air bag is produced in one piece.

4. The inflatable restraint according to claim 1, wherein the ridge of the first fold faces outward.

5. The inflatable restraint according to claim 1, wherein the first fold in an installed, expanded state extends in a longitudinal direction of the motor vehicle.

6. The inflatable restraint according to claim 1, wherein the second fold is fixed through sewing, gluing or welding.

7. The inflatable restraint according to claim 1, comprising a plurality of first folds and a corresponding plurality of second folds.

8. The inflatable restraint according to claim 1, wherein the air bag is a knee air bag.

9. The inflatable restraint according to claim 1, wherein the folding convexly curves the rear section upon inflation of the air bag.

* * * * *